United States Patent [19]

Lindsey et al.

[11] 3,879,491

[45] Apr. 22, 1975

[54] TOUGHENED THERMOPLASTICS CONTAINING POLYDIORGANOSILOXANES

[75] Inventors: Sarah E. Lindsey; John C. Saam, Midland, Mich.

[73] Assignee: Dow Corning Corporation, Midland, Mich.

[22] Filed: Nov. 21, 1973

[21] Appl. No.: 417,990

Related U.S. Application Data

[63] Continuation-in-part of Ser. No. 249,327, May 1, 1972, abandoned.

[52] U.S. Cl. ............... 260/827; 260/879; 260/881; 260/884; 260/885; 260/886; 260/887; 260/898; 260/899; 260/901
[51] Int. Cl. .................... C08f 33/08; C08g 47/10
[58] Field of Search ...................................... 260/827

[56] References Cited
UNITED STATES PATENTS
3,070,573  12/1962  Beck .................................. 260/827

3,575,910  4/1971  Thomas .............................. 260/827
3,624,015  11/1971  Vaughn .............................. 260/827

FOREIGN PATENTS OR APPLICATIONS
1,495,298  2/1969  Germany ........................... 260/827

*Primary Examiner*—Wilbert J. Briggs, Sr.
*Attorney, Agent, or Firm*—Roger H. Borrousch

[57] ABSTRACT

A continuous matrix of a thermoplastic from styrene, methylmethacrylate, ring substituted alkyl styrenes and copolymers thereof having dispersed therein gelled particles of thermoplastic and a polydiorganosiloxane gum having from 15 to 25 mol percent diorganosiloxane units containing vinyl or allyl radicals provides a toughened thermoplastic prepared by polymerizing the thermoplastic monomers having the polydiorganosiloxane gum dispersed therein with agitation at 35°C. to 200°C. by free radical means.

8 Claims, No Drawings

TOUGHENED THERMOPLASTICS CONTAINING POLYDIORGANOSILOXANES

This is a continuation-in-part of application Ser. No. 249,327, filed May 1, 1972, and now abandoned.

This invention relates to a toughened thermoplastic.

Many thermoplastics are inexpensive and have useful properties. However, the thermoplastics also have shortcomings which distract from their use in even broader applications and which add to their manufacturing cost. Some of these properties which need improvement include handling properties, impact strength, weatherability, surface properties and low temperature properties, among others. For example, the need for improved impact strength is apparent to any parent who has purchased a toy for his child made from one of these thermoplastics. Often these thermoplastics toys in normal play will break and leave jagged edges exposed on which the child can be seriously injured to say nothing of the loss of the toy. If toys made from these thermoplastics can be readily broken by a child, it is apparent that these thermoplastic materials will have limited value in many other areas, such as construction of articles, in automobiles, building and the like, unless the thermoplastic can be toughened.

Toughening of commercial glassy thermoplastics by including organic rubbers as fine micro-dispersions is a well known and important step toward providing these materials with increased resistance to mechanical shock. As is shown in U.S. Pat. No. 3,442,851, rubbery polymer can be used to contribute to the impact strength of the finished material, however, one sacrifices the flexural properties by doing so and a balance between impact strength and flexural properties is sought to obtain the maximum impact strength with the least effect on the flexural strength.

It is also known from U.S. Pat. No. 3,239,579, that the alkenyl aromatic resins can be blended with diorganopolysiloxane elastomers to provide a composition which is water resistant, possesses excellent electrical properties, are resistant to deterioration upon aging in the presence of air, light, heat or oxygen and can form articles having good mechanical properties such as impact strength and percent elongation. The diorganopolysiloxane elastomers taught by this patent, however, are limited to those containing methyl and phenyl radicals bonded to the silicon atoms. The compositions are prepared by blending which is an added step in the process and the tensile strength and impact strength both decrease on increasing amount of the silicone rubber.

The present invention has added advantages over the prior art methods for increasing the impact strength in that the blending step is avoided and the increased impact strength obtained does not sacrifice the tensile strength as much as in the prior art. It is therefore an object of this invention to provide a toughened glassy thermoplastic with an improved property profile without significantly altering the processing now being used to make the glassy thermoplastics. This object and others will become more apparent from the following detailed description of the present invention.

This invention relates to a toughened thermoplastic composition having values for notched Izod impact strengths in foot pounds per inch of notch wherein the notch is 45° and 0.1 inch deep of at least 35 percent greater than unmodified thermoplastic wherein the thermoplastic in the toughened thermoplastic composition is the same as the unmodified thermoplastic, consisting essentially of a continuous matrix of a thermoplastic wherein the unpolymerized monomeric compounds were selected from the group consisting of styrene, methylmethacrylate, ring substituted alkyl styrenes, mixtures thereof, and mixtures of at least one monomer selected from the group consisting of styrene, methylmethacrylate and ring substituted alkyl styrenes with at least one monomer selected from the group consisting of acrylonitrile, alpha-methylstyrene, maleic anhydride, methacrylonitrile, acrylic acid, vinyl halides and vinylidene halides, having dispersed therein gelled particles which have a range of diameters from 0.05 micron to 200 microns inclusive, where the geometric mean diameter is from 0.3 micron to 20 microns inclusive, said gelled particles consisting essentially of polydiorganosiloxane of the formula $X[(R_2SiO)_m(RR''SiO)_{1-m}]_xX'$ having polymeric species derived from the above defined monomeric compounds grafted thereto through the R'' radical, where R is a monovalent radical having a maximum of 18 carbon atoms and selected from the group consisting of hydrogen atom, alkyl, haloalkyl, aryl, haloaryl and aralkyl, wherein at least 50 percent of the R radicals are lower alkyl radicals having less than 3 carbon atoms, X is an endblocking group selected from the group consisting of $R'R_2SiO-$ and $HO-$, $X'$ is an endblocking group selected from the group consisting of $R'R_2Si-$ and $H-$, $R'$ is a monovalent radical selected from the group consisting of R radicals, vinyl and allyl, $R''$ is vinyl or allyl, $m$ and $1-m$ represent the mole ratio of each type of diorganosiloxane unit in the polydiorganosiloxane, respectively, and $m$ has a value from 0.75 to 0.85 inclusive, $x$ represents the total number of diorganosiloxane units in the polydiorganosiloxane and has a value sufficient to provide a Williams plasticity of at least 0.060 inch as determined on the unreacted polydiorganosiloxane, the polydiorganosiloxane being present in an amount of from 1 to 15 weight percent based on the total combined weight of the thermoplastic and the polydiorganosiloxane, said toughened thermoplastic composition being prepared by polymerizing with agitation at 35°C. to 200°C. by free radical means, the monomeric compounds described above in which the unreacted polydiorganosiloxane is dispersed.

This invention also relates to an improvement in a method for polymerizing monomeric compounds selected from the group consisting of styrene, methylmethacrylate, ring substituted alkyl styrenes, mixtures thereof, and mixtures of at least one monomer selected from the group consisting of styrene, methylmethacrylate and ring substituted alkyl styrenes with at least one monomer selected from the group consisting of acrylonitrile, alpha-methylstyrene, maleic anhydride, methacrylonitrile, acrylic acid, vinyl halides and vinylidene halides, comprising agitating the monomeric compounds and polymerizing at 35°C. to 200°C. by free radical means, whereby a thermoplastic is obtained, the improvement consisting essentially of dispersing in the agitating monomeric compound prior to polymerization initiation a polydiorganosiloxane in the amount of from 1 to 15 percent by weight based on the combined weight of the monomeric compound and the polydiorganosiloxane and of the formula $X[(R_2SiO)_m(RR''SiO)_{1-m}]_xX'$ wherein R is a monovalent radical having a maximum of 18 carbon atoms and selected from the group consisting of hydrogen atom, alkyl, haloalkyl, aryl, haloaryl and aralkyl, wherein at least 50 percent of the R radicals are lower alkyl radicals having less than 3 carbon atoms, X is an endblocking group selected from the group consisting of R′R$_2$SiO— and HO—, X′ is an endblocking group selected from the group consisting of R′R$_2$Si— and H—, R′ is a monovalent radical selected from the group consisting of R radicals, vinyl and allyl, R″ is vinyl or allyl, $m$ and $1-m$ represent the mole ratio of each type of diorganosiloxane unit in the polydiorganosiloxane, respectively, and $m$ has a value from 0.75 to 0.85 inclusive, $x$ represents the total number of diorganosiloxane units in the polydiorganosiloxane and has a value sufficient to provide a Williams plasticity of at least 0.060 inch, whereby the thermoplastic composition obtained is toughened to the extent of having values for a notched Izod impact strength in foot pounds per inch of notch wherein the notch is 45° and 0.1 inch deep at least 35 percent greater than unmodified thermoplastic wherein the thermoplastic in the toughened thermoplastic composition is the same as the unmodified thermoplastic.

The methods for preparing the toughened thermoplastic compositions of the present invention are essentially those methods as known to the art for the preparation of the polymeric compositions per se. For example, toughened polystyrene compositions of this invention can be prepared by essentially the same methods as are now used commercially to prepare polystyrene. The glassy thermoplastics of the present invention are prepared by polymerizing the monomeric compounds by free radical means at 35°C. to 200°C. while agitating the mixture. The difference between the prior art methods and the method of the present invention is that the monomeric compounds have the hereindefined polydiorganosiloxane dispersed therein before the polymerization of the monomeric compounds is initiated. The product resulting from this method is a toughened thermoplastic composition having an improved property profile.

The preferred method for preparing the toughened thermoplastic compositions of the present invention is to dissolve or disperse the polydiorganosiloxane in the polymerizable monomers which have any inhibitors removed by agitating the mixture until the polydiorganosiloxane is thoroughly dispersed. The polydiorganosiloxane mixes with the monomeric compounds sufficiently well to form a homogeneous distribution of the polydiorganosiloxane in the monomeric compounds and the resulting mixture can be termed a solution or dispersion. The mixture does not separate into layers. The polydiorganosiloxane can be readily dispersed in the agitating polymerizable monomer. The polydiorganosiloxane is added to the agitating polymerizable monomer which can be heated to aid the dispersion or dissolution and then bulk polymerized by heating to a temperature which is dependent upon the particular polymerizable monomers. For example, styrene can be bulk polymerized at 100°C. to 140°C. after the polydiorganosiloxane is added. The polymerization being free radical initiated is preferably carried out under an inert atmosphere such as nitrogen. After the mixture of polydiorganosiloxane and polymerizable monomer is partly polymerized and becomes viscous, the polymerizable mass is cooled to a temperature so that the free radical means can be introduced.

The free radical means can be any of the known free radical generators which will function under the reaction conditions. One class of free radical generators are the peroxides, di(tertiary-butylperphthalate), tertiary-butylpercaprylate, tertiary-butylperbenzoate, di-acetylperoxide, acetylbenzoyl peroxide, dipropionyl peroxide, dilauryoyl peroxide, dimethyl peroxide, diethyl peroxide, dipropyl peroxide, tetralin peroxide, cyclohexane peroxide, acetone peroxide, cyclohexyl hydroperoxide, cumeme hydroperoxide, tertiary-butyl hydroperoxide, methyl cyclohexyl hydroperoxide; another class is the hydrazine derivatives such as hydrazine hydrochloride, hydrazine sulfate, dibenzoylhydrazine, diacetylhydrazine and trimethylhydrazinium iodide; amine oxides such as, pyridine oxide, trimethylamine oxide, dimethylaniline oxide; alkali metal and ammonium persulfates, perborates and percarbonates; ketaldones; azines such as benzalazine, heptaldazine and diphenylketazine; oximes such as d-camphor oxime, acetone oxime, alpha-benzil dioxime, butyraldoxime, alpha-benzoin oxime, oxime and dimethylglyozime; hydrazones such as benzaldehyde phenylhydrazone, phenylhydrazones of cyclohexanone, cyclopentanone; semicarbazones such as semicarbazones of acetone, methylethyl ketone, diethyl ketone, biacetyl, cyclopentanone, cyclohexanone, acetophenone, propiophenone, camphor and benzophenone; Schiff's bases such as benzalaniline, benzal-p-toluidine, benzal-o-toluidine, benzaldehyde derivatives of methylamine, ethylamine and heptylamine; anils and analogous compounds of other amines, such as acetaldehyde anil, isobutyraldehyde anil, heptaldehyde anil; azo-bis-iosbutyronitrile, the reaction products of organometallics such as cadmium alkyl, zinc alkyls, tetraethyl lead and aluminum alkyls with oxygen and high energy ionizing radiation.

After the free radical generator is introduced, the dispersion is suspended in water with the aid of a suspending agent such as sodium carboxymethylcellulose, gum agar, hydroxypropyl methylcellulose, carboxy methylcellulose, methyl cellulose, colloidal silica and colloidal clays. The suspension is agitated to provide droplets of the organic phase, such as about one sixteenth to one eighth inch in diameter. The suspension is then brought to polymerization conditions and the polymerization completed. The resulting product is obtained by removing any unreacted monomer, separating the product which is in bead form by filtering, for example, washing and drying to obtain the product.

The above method describes a bulk type polymerization which is carried out in a suspension. Other methods of polymerization can also be used such as emulsion polymerization and mass polymerization. The known types and conditions for the polymerizations can be used as long as the polydiorganosiloxane is present during the polymerization of the monomeric compounds, the polymerization is by free radical means and the polymerizing medium is agitated to insure thorough distribution of the polydiorganosiloxane.

The polymerizable monomeric compounds for the purpose of this invention include those whose homopolymers and copolymers are glassy thermoplastics under ambient conditions. When single monomers are polymerized, they can be styrene, methylmethacrylate or ring substituted alkyl styrenes such as ortho-vinyltoluene, meta-vinyltoluene, para-vinyltoluene, vinylxylene and isopropylvinylbenzene. The above monomers can be copolymerized such as styrene and methylmethacrylate, styrene and vinylxylene and the like. Also other monomers can be copolymerized with one or more of the above monomers. The other monomers include acrylonitrile, alpha-methylstyrene, maleic anhydride, methacrylonitrile, acrylic acid, vinyl halides and vinylidene halides wherein at least one of these monomers is polymerized with at least one monomer of styrene, methylmethacrylate or a ring substituted alkyl styrene. It is within the scope of the present invention to include minor amounts of other free radical polymerizable monomers, however, these monomers should be present in amounts so that the resulting compositions are still glassy thermoplastics at ambient conditions. The monomers in minor or trace amounts can be, for example, divinylbenzene, butadiene, isoprene, alkylalkacrylates other than methylmethacrylate and alkylacrylates.

The polydiorganosiloxanes used in the present invention are those having a formula $X[(R_2SiO)_m(RR''SiO)_{1-m}]_xX'$ wherein R is a monovalent radical haing a maximum of 18 carbon atoms including a hydrogen atom; an alkyl radical such as methyl, ethyl, propyl, isopropyl, octyl, cyclohexyl, cyclopentyl, dodecyl and octadecyl; haloalkyl such as 3-chloropropyl, 3,3,3-trifluoropropyl, perfluoroalkylethyl radicals, chloromethyl and bromooctadecyl; aryl radicals such as phenyl, tolyl, xylyl, 3-ethylphenyl, xenyl, naphthyl, anthracyl and 3,4-methylethylphenyl; haloaryl radicals such as 2,4-dichlorophenyl, dibromoxenyl, alpha,alpha,alpha-trifluorotolyl and iodonaphthyl and aralkyl radicals such as benzyl, 2-phenyloctyl, 2-phenylethyl, 2-phenylpropyl and 3-methyl-2-(4-isopropylphenyl)heptyl; X is an endblocking group of $R'R_2SiO-$ or $HO-$ (hydroxyl); $X'$ is an endblocking group of $R'R_2Si-$ or H(hydroxyl); $R'$ is an R radical, vinyl or allyl and $R''$ is vinyl or allyl. At least 50 percent of the R radicals are lower alkyl radicals having less than 3 carbon atoms and include methyl and ethyl, preferably methyl. It is also preferred that the R radicals are at least 90 percent lower alkyl.

In the formula for the polydiorganosiloxane, $m$ and $1-m$ represent the mole ratio of each type of diorganosiloxane unit in the polydiorganosiloxane. Thus, $m$ represents the mole ratio of $R_2SiO$ units in the polydiorganosiloxane and $1-m$ represents the mole ratio of $RR''SiO$ units in the polydiorganosiloxane. For the present invention, $m$ has a value from 0.75 to 0.85 inclusive and $1-m$ would have value from 0.15 to 0.25. When $m$ is either more than 0.85 or less than 0.75, the impact strength decreases significantly. Also, in the above formula for the polydiorganosiloxane $x$ represents the total number of diorganosiloxane units in the polydiorganosiloxane and has a value sufficient to provide a Williams plasticity of at least 0.060 inch, preferably 0.060 to 0.0150 inch. The polydiorganosiloxanes can be prepared by methods known in the art such as by polymerizing a mixture of the cyclic $(R_2SiO)_y$ and cyclic $(RR''SiO)_y$ where $y$ is 3 or 4 with a basic catalyst such as potassium silanolate. The polydiorganosiloxanes can be random copolymers, block copolymers and any of the possible forms which exist between the true random copolymer and true block copolymer. The polydiorganosiloxane can be hydroxyl or triorganosilyl endblocked. Because the amount of endblocking is small in these high molecular weight polymers, it has little or no effect on polydiorganosiloxane.

The amount of polydiorganosiloxane can be from 1 to 15 weight percent based on the combined weight of the polydiorganosiloxane and the monomeric compound, preferably, the amount is from 1 to 10 weight percent. Amounts of polydiorganosiloxane greater than 15 weight percent tend to provide compositions which are something less than glassy thermoplastics. Amounts of polydiorganosiloxane less than 1 weight percent do not significantly improve the impact strength.

The products from the method described above are toughened thermoplastic compositions as observed from the values obtained for notched Izod impact strengths as determined by ASTM-D256-56 procedure wherein the values are in 45° 0.1 inch notched foot pounds per inch. For the purposes of the present invention, those impact strength values for the toughened thermoplastic compositions which are at least 35 percent greater than those impact strength values for the thermoplastic compositions without the polydiorganosiloxane modification are considered significant improvement in the toughness or impact strength to be within the scope of this invention. The impact values compared are for the same thermoplastic systems wherein one contains the polydiorganosiloxane and the other does not. Impact strength values between compared thermoplastics with and without the polydiorganosiloxane which are less than 35 percent greater for the with than the without are considered insignificant improvement for the purposes of this invention.

The improvements in impact strength for the toughened thermoplastic compositions of this invention are obtainable with smaller amounts of the polydiorganosiloxane compared to the organic rubber previously used without as much decrease in the ultimate tensile strength.

The toughened thermoplastic compositions of this invention are sufficiently ductile with unidirectional cold rolling to permit fabrication by cold forming processes. This ability to be cold rolled is particularly apparent when the original specimens are injection molded. The brittle-ductile transition for the toughened thermoplastic compositions are lowered, such as for a toughened polystyrene composition the brittle-ductile transition is about −90°C., where this transition was designated as that temperature where the impact strength falls off precipitously to brittle failure.

The surface characteristics of the toughened thermoplastic compositions drastically changed compared to unmodified thermoplastics. For example, the coefficient of friction for the toughened polystyrene composition is about one half of the value for the unmodified polystyrene when 2 weight percent polydiorganosiloxane is used.

The toughened thermoplastics of the present invention are significantly more resistant to weathering than thermoplastics modified with unsaturated organic rubbers. This property would allow more outside use of the thermoplastics.

The toughened thermplastic compositions of this invention consist essentially of a continuous matrix of a thermoplastic derived from the unpolymerized monomers as defined above. The continuous thermoplastic matrix has dispersed therein gelled particles which have a range of diameters from 0.05 to 200 microns inclusive where the geometric means diameter is from 0.3 micron to 20 microns inclusive. The geometric mean diameter is a mean diameter of the particle distribution in which 50 percent of the particles are larger and 50 percent of the particles are smaller than this geometric mean diameter. The geometric mean diameter can be determined as set forth in *Small Particle Statistics*, by G. Herdan, Elsever Publishing Co., N.Y., 1953 Printing, Chapter, 4, page 43.

The gelled particles consist essentially of the polydiorganosiloxane as defined herein having polymeric species derived from the unpolymerized monomeric compounds grafted to the polydiorganosiloxane through the R" radical of the polydiorganoxiloxane. Because the polymerization is by free radical means, some grafting can be expected to be through the methyl or ethyl radicals as well as other R radicals. Because the vinyl or allyl radicals are so much more reactive, the grafting for the purposes of this invention will be said to be through the R" radicals. These gelled particles are formed during the polymerization of the dispersion of the polydiorganosiloxane in the unpolymerized monomeric compounds.

The preferred toughened thermoplastic compositions are the toughened polystyrene and the toughened styrene-acrylonitrile copolymers with impact strengths 50 percent greater than the impact strengths of the unmodified polystyrene and styrene-acrylonitrile copolymers.

The following examples are presented for illustrative purposes only and should not be construed as limiting this invention which is properly delineated in the claims.

EXAMPLE 1

A hydroxyl endblocked polydiorganosiloxane having 18 mole percent methylvinylsiloxane units and 82 mole percent dimethylsiloxane units and a Williams plasticity of 0.071 inch in an amount of 36.8 grams was dissolved in 919 grams of styrene from which the inhibitors were removed. This solution was initially bulk polymerized by heating to 120°C. for 1.5 hours while being stirred at 125 r.p.m. The resulting viscous partly polymerized mass was cooled to 70°C. and then 1.9 grams of benzoyl peroxide was added followed by the addition of a solution of 16 grams of sodium carboxymethylcellulose in 3100 ml. of water with an increase in the rate of stirring so that a suspension of the viscous, partly polymerized mass formed and provided droplets of approximately one-eighth inch in diameter in the aqueous medium. This suspension was stirred and heated at 80°C. for 16 hours after which the polymerization was essentially complete. The last traces of monomer were removed by steam distillation. A nearly quantitative yield of a polydiorganosiloxane modified polystyrene was obtained in the form of solid beads which were easily filtered and dried.

The Williams plasticity as used herein was determined on a 4.2 gram sample, for three minutes at room temperature in accordance with ASTM-D-926-67 procedure.

Sample Preparation: Samples were prepared for mechanical testing by mixing and shearing 80 grams of thermoplastic composition in a commercial mixer, a Brabender Plasticorder, at 180°C. for 6 minutes and then compression molding at 170°C. into 70 mil slabs. The slabs were cut into suitable strips for the Notched Izod Impact Test (ASTM-D-256-56). Samples were also compression molded into 2.5 inch by 0.5 inch by 0.5 inch bars for the Notched Izod Impact Test. The difference in results obtained on samples prepared by either method was negligible. A 45° 0.1 inch notch was used for the Notched Izod Impact Test and the results were recorded in foot-pounds per inch of notch.

*Trademark of C. W. Brabender Instruments, Inc., South Hackensack, New Jersey.

Injection molded test pieces were prepared with a 1 reciprocating screw machine made by Newbury Industries, Model H 130RS. The test pieces were molded under the following conditions: cycle time of 45 seconds, injection time of 7 seconds, gauge pressure of 650 p.s.i., mold temperature of cavity of 100°F., mold temperature of core of 100°F., rear zone temperature of 440°F., front zone temperature of 455°F. and nozzle temperature of 450°F. The injection molded test pieces were a 5½ inch test bar, a 5½ inch flex bar and a 2 inch diameter disc with each test piece being 0.135 inch thick. The notched Izod impact strength values for both the compression molded and injection molded samples had about ±10 percent deviation for different samples of the same material.

The compression molded samples of the polydiorganosiloxane modified polystyrene prepared above had a notched Izod impact strength of 1.25 foot-pounds per inch of notch and the injection molded samples had a notched Izod impact strength of 1.36 foot-pounds per inch of notch. A sample prepared as described above except the polydiorganosiloxane was left out had a notched Izod impact strength of 0.38 foot-pounds per inch of notch for compression molded samples. Thus, the polydiorganosiloxane modified polystyrene was a toughened thermoplastic composition having approximately 230 percent improvement in notched Izod impact strength compared to the unmodified polystyrene.

EXAMPLE 2

A. In a manner similar to the procedure of Example 1, 91.9 grams of a hydroxyl endblocked polydiorganosiloxane having 23 mole percent methylvinylsiloxane units and 77 mole percent dimethylsiloxane units and a Williams plasticity of 0.115 inch was mixed with 919 grams of styrene (inhibitor removed) and bulk prepolymerized at 118° to 120°C. for 1.5 hours, cooled to 50°C., and then 1.9 grams of benzoyl peroxide was added followed by a solution of 20 grams of sodium carboxymethylcellulose in 3100 ml. of water to form a suspension. The suspension was then polymerized at 80°C. for 18 hours, steam distilled, filtered and dried to provide solid beads of polydiorganosiloxane modified polystyrene. Compression molded samples had a notched Izod impact strength of 1.55 foot-pounds per inch of notch and injection molded samples had a notched Izod impact strength of 1.59 foot-pounds per inch of notch. Thus, the polydiorganosiloxane toughened polystyrene showed an improvement in notched Izod impact strengths of approximately 300 percent. This toughened polystyrene contained 10 weight percent polydiorganosiloxane based on the combined weight of the polydiorganosiloxane and the styrene.

B. A mixture of 24 grams of the polydiorganoxiloxane toughened polystyrene prepared in A. above was mixed with 56 grams of the polystyrene prepared in Example 1 (without polydiorganosiloxane). This mixture was fused and mixed under shear at 190°C. in a Brabender Plasticorder and then compression molded into test pieces. The test pieces had a notched Izod impact strength of 0.68 foot-pounds per inch of notch. This blended mixture of a polydiorganosiloxane toughened polystyrene and polystyrene had a polydiorganosiloxane content of 3 weight percent based on the combined weight of the polydiorganosiloxane and polystyrene. This blended mixture was toughened as shown by an increase in notched Izod impact strength of about 80 percent. This shows that polydiorganosiloxane toughened thermoplastic compositions of this invention can be further blended with additional thermoplastic while retaining its ability to toughen the final product.

EXAMPLE 3

This example shows the toughening of a styrene-acrylonitrile copolymer in accordance with the present invention. 18.4 grams of a hydroxyl endblocked polydiorganosiloxane having 18 mole percent methylvinylsiloxane units and 82 mole percent dimethylsiloxane units was dissolved in 643.3 grams of styrene and 275.7 grams of acrylonitrile. The inhibitors having been removed from each monomer. To this mixture, 1.9 grams of benzoyl peroxide was added and the mixture was stirred at 120 r.p.m. at 80° to 85°C. for 1.5 hours. To the resulting partly polymerized mass, a solution of 18 grams of sodium carboxymethylcellulose in 3100 ml. of water was added and the rate of agitation was accelerated so as to give a uniform suspension of the partly polymerized mass. Polymerization was continued in the suspension for 18 hours at 80° to 85°C. A high yield of polydiorganosiloxane modified styrene-acrylonitrile copolymeric thermoplastic composition in the form of beads was obtained. This thermoplastic composition, containing 2 weight percent of polydiorganosiloxane, was isolated and fabricated into test samples as described in Example 1. The notched Izod impact strength of a compression molded sample was 2.03 foot-pounds per inch of notch. This impact strength was an improvement of about 400 percent over an unmodified copolymer of styrene and acrylonitrile.

EXAMPLE 4

A. This example shows the toughening of a styrene-methylmethacrylate-alpha-methylstyrene terpolymer in accordance wtih the present invention. 16.08 grams of a hydroxyl endblocked polydiorganosiloxane having 20 mole percent methylvinylsiloxane units and 80 mole percent dimethylsiloxane units and having a Williams plasticity of 0.115 inch was mixed wtih 160.8 grams of styrene, 46 grams of methylmethacrylate and 23 grams of alpha-methylstyrene and allowed to stand overnight. The mixture was then placed in a flask under a nitrogen atmosphere, stirred at about 150 r.p.m.; heated to 120°C. and held at this temperature for 1.75 hours. The mixture was then cooled below 80°C. and 0.045 gram of benzoyl peroxide added followed by a solution of 4.5 grams of sodium carboxy methylcellulose in 775 grams of water. The mixture was stirred rapidly to form a suspension and the temperature increased to 80°C. and maintained at this temperature for 7 hours. The completed polymerization mixture was stripped to remove any residual monomers and a polydiorganosiloxane modified styrene-methylmethacrylate-alpha-methylstyrene terpolymer was obtained in the form of beads after filtering, washing with water and ethanol and drying in a vacuum oven. The beads were then fabricated into test pieces by massing in a Brabender Plasticorder at 63 r.p.m., 190°C. for 6 minutes (CAM Head) and then compression molded at 173°C. The polydiorganosiloxane modified terpolymer had a notched Izod impact strength of 1.168 foot-pounds per inch of notch.

B. The above procedure of A. was repeated except the polydiorganosiloxane was left out. The resulting styrene-methylmethacrylate-alpha-methylstyrene terpolymer had a notched Izod impact strength of 0.337 foot-pounds per inch of notch for compression molded samples. Thus, the polydiorganosiloxane modified terpolymer was toughened to the extent that the impact strength increased about 250 percent over the unmodified terpolymer.

EXAMPLE 5

The procedure of Example 2 was repeated except the amount of the polydiorganosiloxane was varied as shown in Table I. The test samples prepared were tested in accordance with the ASTM procedures as follows: tensile strength at break and elongation at break, ASTM-D-638, run on injection molded samples at a jaw separation rate of 0.2 inch per minute; flexural strength and flexural modulus ASTM-790-66, run at a rate of cross head motion of 0.05 inch per minute; and heat distortion temperature, ASTM-D-648-56 (264 p.s.i.) on samples annealed for 16 hours at 98°C. The results obtained were as shown in Table I.

TABLE I

| Run No. | Weight Percent Polydiorgano-siloxane | Notched Izod Impact Strength ft. lbs/in. of Notch | | Tensile Strength At Break p.s.i. | Elongation At Break, % | Flexural Strength p.s.i. | Flexural Modulus p.s.i | Heat Distortion temperature, °C | Static Coefficient of Friction |
|---|---|---|---|---|---|---|---|---|---|
| | | Compression Molded | Injection Molded | | | | | | |
| 1. | (STYRON T430)* | 0.93 | 1.0 | 4050 | 21 | — | — | 91 | 0.725 |
| 2. | (STYRON 686)* | 0.32 | 0.33 | 5080 | 4 | 12.900 | 534,000 | 90 | 0.80 |
| 3. | 0.0* | 0.38 | — | — | — | — | — | — | — |
| 4. | 1.0 | 0.58 | 0.71 | 6150 | 10 | 13,300 | 475,000 | 91 | 0.70 |
| 5. | 2.0 | 0.84 | 0.99 | 5250 | 16 | 11,900 | 416,000 | 90 | 0.37 |
| 6. | 3.0 | 0.98 | 1.23 | — | — | — | — | — | — |
| 7. | 4.0** | 1.25 | 1.36 | 4500 | 15.1 | — | — | — | — |
| 8. | 5.5 | 1.17 | — | 4290 | 26 | — | — | — | 0.37 |
| 9. | 7.0 | 1.63 | 1.46 | 4240 | 38 | 8,100 | 294,000 | 88 | 0.35 |
| 10. | 10.0 | 1.55 | 1.59 | 3440 | 40 | — | — | 86 | 0.25 |

* Presented for comparative purposes. Styron a registered trademark for The Dow Chemical Co. for polystyrene
** Polydiorganosiloxane as described in Example 1.

From Table I, the polydiorganosiloxane modified polystyrene was toughened as shown by an increase in impact strength (compression molded) of more than 50 percent at a one weight percent level of polydiorganosiloxane. The polydiorganosiloxane toughened polystyrene as shown in Table I reaches the same level of toughness between 2 and 3 weight percent polydiorganosiloxane (shown by impact strength) as does the organic toughened polystyrene, Styron T430, which contains about 6 to 8 weight percent of the organic toughening additive. The tensile strength of the polydiorganosiloxane toughened polystyrene is higher than the Styron T430.

EXAMPLE 6

A hydroxyl endblocked polydiorganosiloxane having 20 mole percent methylvinylsiloxane and 80 mole percent dimethylsiloxane and a Williams plasticity of 0.067 inch was prepared by the emulsion polymerization precedure as described in U.S. Pat. No. 3,294,725 by polymerizer polydimethylsiloxane cyclic tetramer and polymethylvinylsiloxane cyclic tetramer in an aqueous emulsion using dodecylbenzene sulfonic acid as the superfactant. The polydiorganosiloxane emulsion was 35 weight percent solids. The following ingredients were mixed in a flask under a nitrogen atmosphere and rapidly stirred at 40°C. for 24 hours to complete the emulsion polymerization. The emulsion was then cooled and the emulsion was broken with calcium chloride. The resulting polydiorganosiloxane modified styrene-acrylonitrile copolymer was separated from the aqueous phase, washed twice with water and once with ethanol and dried in a vacuum oven.

A.
| | |
|---|---|
| 128 | grams of styrene, |
| 64 | grams of acrylonitrile |
| 173.6 | grams of water |
| 0.4 | gram of $K_2S_2O_8$ and |
| 41.1 | grams of the polydiorganosiloxane emulsion containing 0.412 gram of dodecylbenzene sulfonic acid. |

B. For comparative purposes, this emulsion was prepared as described above with the following ingredients:

| | |
|---|---|
| 128 | grams of styrene, |
| 64 | grams of acrylonitrile, |
| 144 | grams of water, |
| 0.4 | gram of $K_2S_2O_8$ and |
| 0.412 | gram of dodecylbenzene sulfonic acid. |

The test samples were prepared as described in Example 4, A. The notched Izod impact strength for A. was 0.690 foot-pounds per inch of notch and for B., 0.492 foot-pounds per inch of notch. Thus, the polydiorganosiloxane modified styrene-acrylonitrile showed an increase in impact strength of about 40 percent over the unmodified styrene-acrylonitrile copolymer.

EXAMPLE 7

Polydiorganosiloxane modified polystyrene compositions were prepared and tested as described in Example 1 except 4 weight percent polydiorganosiloxane was added and the molar ratio of the siloxane units were varied as shown in Table II wherein the polydiorganosiloxane is defined by $m$ in the formula $HO\{[(CH_3)_2SiO]_m[(CH_3)(CH_2\!\!=\!\!CH)SiO]_{1-m}\}_xH$ and $x$ was such as to provide a Williams plasticity greater than 0.060 inch.

TABLE II

| Run. No. | m | Notched Izod Impact Strength ft.-lbs./in. of Notch | % Increase in Impact Over Run No. 1 |
|---|---|---|---|
| 1. | no polydiorganosiloxane | 0.38 | — |
| 2. | 0.905 | 0.37 | −2.6 |
| 3. | 0.820 | 1.25 | +228.9 |
| 4. | 0.770 | 1.01 | +165.8 |
| 5. | 0.700 | 0.42 | +10.5 |

EXAMPLE 8

The polydiorganosiloxane modified polystyrene was prepared in accordance with Example 1. A low temperature impact test was carried out and consisted of enclosing mounted 3 inch by 0.5 inch by 0.5 inch test bars in the notched Izod impact strength test in an insulated environmental chamber which could be cooled to −180°C. by passing liquid nitrogen into the chamber. The temperature was monitered with a thermocouple molded within the test bars. The junction of the thermocouple was in the center of the bars just below the notch. Prior experiments had shown temperature differentials between the surface and center of the test bars to be less than 1°C. at temperatures as low as −100°C. provided that 10 minutes were allowed to come to thermal equilibrium. The presence of the thermocouple was demonstrated to have no detectable effect on the impact strength values. After the mounted test specimen was brought to the desired temperature, the chamber was quickly removed and the test bar was impacted as the temperature was observed. The results were as shown in Table III.

TABLE III

| Temperature, °C. | Notched Izod Impact Strength, ft.-lbs./in. of notch |
|---|---|
| 27.0 | 1.12 |
| −6.0 | 0.80 |
| −20.0 | 0.69 |
| −41.5 | 0.82 |
| −59.5 | 0.67 |
| −76.0 | 0.67 |
| −89.5 | 0.58 |
| −105.5 | 0.24 |

The results show that the critical brittleductile transition was in the range of −90°C.

EXAMPLE 9

A. A mixture of 155 pounds of polydimethylsiloxane cyclics, 45.1 pounds of polymethylvinylsiloxane cyclics, 190 grams of a potassium silanolate catalyst (sufficient to give 1 potassium atom per 10,000 silicon atoms) and 91 grams of dimethylformamide was polymerized at 130° to 140°C. for 3.5 hours under a nitrogen purge with mixing action. At the end of the time, the reaction was stopped with carbon dioxide. The resulting hydroxyl endblocked polydiorganosiloxane had 19 mole percent methylvinylsiloxane units, and 81 mole percent dimethylsiloxane units as determined by nuclear magnetic resonance. The polydiorganosiloxane had a Williams plasticity of 0.108 inch.

B. A portion of this was stripped in a commercial mixer for 1 hour at 150°C. under vacuum. The resulting polydiorganosiloxane had a Williams plasticity of 0.126 inch.

C. A 150 gram sample of the polydiorganosiloxane obtained in A. above was dried for 1 hour at 150°C. under a nitrogen purge in a commercial mixer. To the dried polydiorganosiloxane, 0.8 cc. of the same potassium silanolate as used in A. above was added to reactivate the polymerization. The polymerization was continued for 3.5 hours at 150°C. under a nitrogen purge, stopped with carbon dioxide and then stripped for 1 hour at 150°C. under vacuum. The resulting polydiorganosiloxane had a Williams plasticity of 0.103 inch.

D. The procedure of C. was carried out on a 150 gram sample of the polydiorganosiloxane obtained in A. above, except the polymerization was continued for 24 hours. The resulting polydiorganosiloxane had a Williams plasticity of 0.135 inch and had 18 mole percent methylvinylsiloxane units and 82 mole percent dimethylsiloxane units as determined by nuclear magnetic resonance.

E. Each of the polydiorganosiloxanes from B., C. and D. above were used to make polydiorganosiloxane modified polystyrene in accordance with this invention. In each case, 36.76 grams of polydiorganosiloxane was dissolved overnight in 919 grams of styrene and then the mixture was bulk polymerized for 2.5 hours at 120°C. The resulting mixture was cooled to 60°C., 1.9 grams of benzoyl peroxide was added followed by a solution of 18 grams of sodium carboxymethylcellulose in 3100 ml. of water. The mixture was stirred to make a suspension which was heated to 80°C. overnight to complete the polymerization. Any unreacted monomers were distilled from the suspension which was then filtered, washed and dried to recover polydiorganosiloxane modified polystyrene in the form of beads. The beads were masticated in a Brabender Plasticorder (180°C./6 minutes/62 r.p.m./CAM head) and compression molded at 177°C. The notched Izod impact strengths were determined and were as shown in Table IV.

TABLE IV

| Polydiorgano-Siloxane | Notched Izod Impact Strength ft.-lbs./in. of Notch | % Increase In Impact Strength Over Control |
|---|---|---|
| Control-none | 0.38 | — |
| B. | 1.09 | 187 |
| C. | 0.93 | 145 |
| D. | 0.63 | 66 |

EXAMPLE 10

The polydiorganosiloxane modified polystyrene of Example 1 was exposed to radiation from the carbon arc in an artificial weathering apparatus, Dew Cycle Atlas Weatherometer*, for the times shown in Table V. For comparative purposes, Styron T430 a high impact polystyrene modified with 6 to 8 weight percent polydiene was also run in the weatherometer. After the times shown, the tensile strength and elongation at break and the notched Izod impact strength were determined.

*Trademark for Atlas Electric Devices Co., Chicago, Illinois

TABLE V

| | Polydiorganosiloxane Modified Polystyrene | | | Styron T-430 | | |
|---|---|---|---|---|---|---|
| Time, Hours | Tensile, p.s.i. | Elongation,% | Impact Strength, ft.-lbs./in. of Notch | Tensile p.s.i. | Elongation,% | Impact Strength ft.-lbs./in. of Notch |
| 0 | 4500 | 15.1 | 1.25 | 4020 | 29.3 | 1.09 |
| 16 | 4300 | 20.8 | — | 4000 | 17.2 | — |
| 36 | 4350 | 15.4 | — | 4010 | 5.59 | — |
| 72 | 4300 | 5.9 | — | 3660 | 4.65 | — |
| 107 | 4180 | 6.1 | — | — | — | — |
| 110 | — | — | — | — | — | 0.77 |
| 200 | 3680 | 6.2 | 1.04 | — | — | 0.56 |

EXAMPLE 11

A series of polydiorganosiloxane modified polystyrene compositions were prepared by the procedure of Example 1 wherein the polydiorganosiloxane had a Williams plasticity of 0.085 inch instead of 0.071 inch and the initial bulk polymerization temperature was varied. The polydiorganosiloxane modified polystyrene compositions were isolated, compression molded and the notched Izod impact strength determined. The gel fraction was also determined by observing the weight fraction of insoluble material in the polystyrene matrix. The insoluble weight fraction was determined by dissolving a 10 gram portion of each composition in methylene chloride and separating the gel fraction by centrifugation, washing the gel fraction with methylene chloride and then drying the gel. The results were as shown in Table VI.

TABLE VI

| Initial Bulk Polymerization Temperature, °C. | Gel Fraction, Wt. % | $\overline{M}_n$ of Soluble Polystyrene | Impact Strength ft.-lbs./in. of Notch |
|---|---|---|---|
| 80 | 3.2 | 162,000 | 0.52 |
| 100 | 19.9 | 169,000 | 0.77 |
| 120 | 16.6 | 116,000 | 1.07 |
| 140 | 13.6 | 102,000 | 1.18 |

EXAMPLE 12

A series of polydiorganosiloxane modified polystyrene compositions were prepared by the procedure of Example 1, except the rate of stirring was varied for each preparation. The resulting polydiorganosiloxane modified polystyrene compositions were isolated, notched Izod impact strengths were determined and microtomed sections were examined by phase contract microscopy to obtain the average particle sizes as shown by geometric mean diameters ($\overline{X}_g$) of a lognormal particle size distribution. The results were as shown in Table VII where $S_g$ is the standard deviation factor.

TABLE VII

| Rate of Stirring, r.p.m. | Impact Strength, ft.-lbs./in of Notch | $\overline{X}_g$, μM | $S_g$ |
|---|---|---|---|
| 40 | 1.10 | 0.47 | 1.81 |
| 80 | 0.70 | — | — |
| 125 | 1.25 | 0.58 | 2.05 |
| 180 | 1.10 | 0.83 | 2.14 |
| 200 | 1.11 | 0.62 | 1.90 |

EXAMPLE 13

This example is presented for comparative purposes.

A. A mixture of 70 grams of a commercial polystyrene (Styron 686) and 2.1 grams of a hydroxyl endblocked polydiorganosiloxane having 19 mole percent methylvinylsiloxane units and 81 mole percent dimethylsiloxane units and having a Williams plasticity of 0.139 inch, was mixed and sheared in a Brabender Plasticorder at 180°C. for 15 minutes. The resulting non-uniform composition was compression molded and the Izod impact strength was 0.37 foot-pounds per inch of notch.

B. The procedure in A. above was repeated except 0.7 grams of dicumyl peroxide was added prior to mixing. The resulting non-uniform composition was compression molded and the notched Izod impact strength was 0.15 foot-pounds per inch of notch. As observed both A. and B. showed no improvement in impact strength.

C. The polydiorganosiloxane as described in A. above was used to prepare a polydiorganosiloxane modified polystyrene using the procedure of Example 1. The resulting polydiorganosiloxane modified polystyrene was isolated, compression molded and a notched Izod impact strength of 1.09 foot-pounds per inch of notch was obtained.

EXAMPLE 14

This example shows the effect of cold rolling on the mechanical properties of the polydiorganosiloxane modified polystyrene compared to the commercial polybutadiene modified polystyrene (Styron T-430). In Table VIII, Composition A. was Styron T-430, Composition B. was the polydiorganosiloxane modified polystyrene of Example 5, Run No. 5 and Composition C. was a polydiorganosiloxane modified polystyrene prepared as described in Example 1. Each material was injection molded into tensile bars 5.25 inch by 0.5 inch by 0.135 inch and passed through a variable speed rubber mill at room temperature with both rolls set at 34 r.p.m. and with the original gap set at 0.135 inch and then the gap was decreased in 0.005 inch increments after each pass. The mechanical properties were as shown in Table VIII.

TABLE VIII

| Composition | Compression, % | Tensile Strength, p.s.i. | | Elongation, % | | Initial Modulus, p.s.i. | Impact Strength, ft.-lbs./in. of Notch |
|---|---|---|---|---|---|---|---|
| | | At Yield | At Break | At Yield | At Break | | |
| A. | 0 | 4000 | 4050 | 5 | 20 | 101,000 | 1.00 |
| | 15.1 | 4200 | 4890 | 6 | 23 | 90,500 | — |
| | 30.5 | 5370 | 5820 | 6 | 14 | 99,200 | — |
| | 44.6 | 6600 | 6600 | 8 | 31 | 93,200 | — |
| B. | 0 | 5100 | 5250 | 6 | 16 | 106,500 | 0.99 |
| | 12.7 | 6450 | 6530 | 7 | 12 | 112,000 | — |
| | 31.3 | 7700 | 7060 | 7 | 16 | 111,000 | — |
| | 42.5 | 7860 | 6960 | 9 | 22 | 104,000 | 1.34 |
| C. | 0 | 4524 | 4890 | 5 | 26 | 119,000 | 1.40 |
| | 15.8 | 4670 | 5550 | 5 | 34 | 100,000 | — |
| | 27.8 | 6240 | 6040 | 7 | 44.4 | 96,000 | — |
| | 42.9 | 7120 | 6540* | 8 | 153* | 104,000 | 1.66 |

*Sample did not fail, test discontinued at this point.

That which is claimed is:

1. A toughened thermoplastic composition having values for notched Izod impact strengths in foot pounds per inch of notch wherein the notch is 45 degrees and 0.1 inch deep at least 35 percent greater than unmodified thermoplastic wherein the thermoplastic in the toughened thermoplastic composition is the same as the unmodified thermoplastic, consisting essentially of a continuous matrix of a thermoplastic wherein the unpolymerized monomeric compounds were selected from the group consisting of styrene, methylmethacrylate, ring substituted alkyl styrenes, mixtures thereof, and mixtures of at least one monomer selected from the group consisting of styrene, methylmethacrylate and ring substituted alkyl styrenes with at least one monomer selected from the group consisting of acrylonitrile, alpha-methylstyrene, maleic anhydride, methacrylonitrile, acrylic acid, vinyl halides and vinylidene halides, having dispersed therein gelled particles which have a range of diameters from 0.05 micron to 200 microns inclusive, where the geometric mean diameter is from 0.3 micron to 20 microns inclusive, said gelled particles consisting essentially of polydiorganosiloxane of the formula $X[(R_2SiO)_m(RR''SiO)_{1-m}]_xX'$ having polymeric species derived from the above defined monomeric compounds grafted thereto through the R'' radical, where R is a monovalent radical having a maximum of 18 carbon atoms and selected from the group consisting of hydrogen atom, alkyl, haloalkyl, aryl, haloaryl and aralkyl, wherein at least 50 percent of the R radicals are lower alkyl radicals having less than 3 carbon atoms, X is an endblocking group selected from the group consisting of R'R$_2$SiO— and HO—, X' is an endblocking group selected from the group consisting of R'R$_2$Si— and H—, R' is a monovalent radical selected from the group consisting of R radicals, vinyl and allyl, R'' is vinyl or allyl, $m$ and $1-m$ represent the mole ratio of each type of diorganosiloxane unit in the polydiorganosiloxane, respectively, and $m$ has a value from 0.75 to 0.85 inclusive, $x$ represents the total number of diorganosiloxane units in the polydiorganosiloxane and has a value sufficient to provide a Williams plasticity of at least 0.060 inch as determined on the unreacted polydiorganosiloxane, the polydiorganosiloxane being present in an amount of from 1 to 15 weight percent based on the total combined weight of the thermoplastic and the polydiorganosiloxane, said toughened thermoplastic composition being prepared by polymerizing with agitation at 35°C. to 200°C. by free radical means, the monomeric compounds described above in which the unreacted polydiorganosiloxane is dispersed.

2. The toughened thermoplastic composition according to claim 1 in which R is methyl, R'' is vinyl and the Williams plasticity is from 0.060 to 0.150 inch.

3. The toughened thermoplastic composition according to claim 1 in which the monomeric compound is styrene.

4. The toughened thermoplastic composition according to claim 2 in which the monomeric compound is styrene.

5. The toughened thermoplastic composition according to claim 1 in which the monomeric compound is a mixture of styrene and acrylonitrile.

6. The toughened thermoplastic composition according to claim 2 in which the polydiorganosiloxane is present in an amount of from 1 to 10 weight percent.

7. In a method for polymerizing monomeric compounds selected from the group consisting of styrene, methylmethacrylate, ring substituted alkyl styrenes, mixtures thereof, and mixtures of at least one monomer selected from the group consisting of styrene, methylmethacrylate and ring substituted alkyl styrenes with at least one monomer selected from the group consisting of acrylonitrile, alpha-methylstyrene, maleic anhydride, methacrylonitrile, acrylic acid, vinyl halides and vinylidene halides, comprising agitating the monomeric compounds and polymerizing at 35°C. to 200°C. by free radical means, whereby a thermoplastic is obtained, the improvement consisting essentially of dispersing in the agitating monomeric compound prior to polymerization initiation a polydiorganosiloxane in the amount of from 1 to 15 percent by weight based on the combined weight of the monomeric compound and the polydiorganosiloxane and of the formula $X[(R_2SiO)_m(RR''SiO)_{1-m}]_xX'$ wherein R is a monovalent radical having a maximum of 18 carbon atoms and selected from the group consisting of hydrogen atom, alkyl, haloalkyl, aryl, haloaryl and aralkyl, wherein at least 50 percent of the R radicals are lower alkyl radicals having less than 3 carbon atoms, X is an endblocking group selected from the group consisting of $R'R_2SiO-$ and $HO-$, X' is an endblocking group selected from the group consisting of $R'R_2Si-$ and $H-$, R' is a monovalent radical selected from the group consisting of R radicals, vinyl and allyl, R'' is vinyl or allyl, $m$ and $1-m$ represent the mole ratio of each type of diorganosiloxane unit in the polydiorganosiloxane, respectively, and $m$ has a value from 0.75 to 0.85 inclusive, $x$ represents the total number of diorganosiloxane units in the polydiorganosiloxane and has a value sufficient to provide a Williams plasticity of at least 0.060 inch, whereby the thermoplastic composition obtained is toughened to the extent of having values for a notched Izod impact strength in foot pounds per inch of notch wherein the notch is 45° and 0.1 inch deep at least 35 percent greater than unmodified thermoplastic wherein the thermoplastic in the toughened thermoplastic composition is the same as the unmodified thermoplastic.

8. The method in accordance with claim 7 in which the monomeric compound is styrene, R is methyl, R'' is vinyl and the Williams plasticity is from 0.060 to 0.150 inch.

* * * * *